United States Patent
Liu et al.

(10) Patent No.: US 8,792,549 B2
(45) Date of Patent: Jul. 29, 2014

(54) DECODER-DERIVED GEOMETRIC TRANSFORMATIONS FOR MOTION COMPENSATED INTER PREDICTION

(75) Inventors: Wei Liu, San Jose, CA (US); Mohammad Gharavi-Alkhansari, Santa Clara, CA (US); Ehsan Maani, San Jose, CA (US); Ali Tabatabai, Cupertino, CA (US)

(73) Assignee: Sony Corporation, Tokyo (JP)

( * ) Notice: Subject to any disclaimer, the term of this patent is extended or adjusted under 35 U.S.C. 154(b) by 397 days.

(21) Appl. No.: 13/037,054

(22) Filed: Feb. 28, 2011

(65) Prior Publication Data

US 2012/0218443 A1 Aug. 30, 2012

(51) Int. Cl.
*H04N 7/12* (2006.01)
*H04N 11/04* (2006.01)
*H04N 11/02* (2006.01)

(52) U.S. Cl.
USPC ................................ 375/240.01; 375/E7.026

(58) Field of Classification Search
CPC . H04N 7/50; H04N 7/26271; H04N 7/26244; H04N 9/8042; H04N 5/85
See application file for complete search history.

(56) References Cited

U.S. PATENT DOCUMENTS

| | | | |
|---|---|---|---|
| 6,785,333 B2 | 8/2004 | Yoo | |
| 6,901,110 B1 | 5/2005 | Tsougarakis et al. | |
| 2003/0072374 A1 | 4/2003 | Sohm | |
| 2003/0086498 A1 | 5/2003 | Lee et al. | |
| 2004/0013309 A1 | 1/2004 | Choi et al. | |
| 2004/0131261 A1* | 7/2004 | Lee et al. | 382/232 |
| 2007/0041445 A1* | 2/2007 | Chen et al. | 375/240.16 |
| 2007/0076796 A1* | 4/2007 | Shi et al. | 375/240.16 |
| 2007/0297513 A1 | 12/2007 | Biswas et al. | |
| 2008/0240245 A1 | 10/2008 | Lee et al. | |
| 2008/0240247 A1* | 10/2008 | Lee et al. | 375/240.16 |
| 2011/0280309 A1* | 11/2011 | Francois et al. | 375/240.16 |

OTHER PUBLICATIONS

Krutz et al., "Tool Experiment 3: Inter Prediction in HEVC", Joint Collaborative Team on Video (JCT-VC) of ITU-T SG16 WP3 and ISO/IEC JTC1/SC29/WG11 1st Meeting: Dresden, DE, Apr. 15-23, 2010, Document JCTVC-A303, pp. 1-11.

Kemal Ugur, "Part I: Advanced Prediction Models", H.264/AVC video Coding Standard, Research Engineering Video/Image Coding Group Nokia Research Center,Dec. 19, 2006, pp. 1-45.

Li et al, "Content-based irregularly shaped macroblock partition for inter frame prediction in video coding",Elsevier Signal Precessing: Image Communication 25, journal homepage: www.elsevier.com/locate/image, pp. 610-621.

Jafari et al., "Fast Intra- and Inter-Prediction Mode Decision in H.24 Advanced Video Coding", IJCSNS International Journal of Computer Science and Network Security, vol. 8, No. 5, May 5, 2008, pp. 130-140.

* cited by examiner

*Primary Examiner* — Sath V Perungavoor
*Assistant Examiner* — Nam Pham
(74) *Attorney, Agent, or Firm* — Haverstock & Owens LLP

(57) ABSTRACT

A method of estimating motion by estimating motion parameters of a complex motion model using reconstructed neighboring pixels of the current block and then applying the estimated motion parameters to the coordinates of the current block to determine motion compensated in a corresponding reference block. The parameters are not transmitted to a decoder and are derived at the decoder side. The encoder only sends a 1-bit control-flag to indicate whether the derived parameters should be used.

28 Claims, 5 Drawing Sheets

DECODER-DERIVED GEOMETRIC TRANSFORMATIONS FOR MOTION COMPENSATED INTER PREDICTION

FIELD OF THE INVENTION

The present invention relates to the field of image/video processing. More specifically, the present invention relates to inter prediction in video encoding.

BACKGROUND OF THE INVENTION

Motion compensated prediction is an important tool in state of the art coding. Most current motion compensated prediction techniques only consider translational motion models. A significant portion of inter-frame motion contains complex behaviors such as zooming, panning, rotation, shearing and others. For areas with complex motion, current motion compensated prediction schemes usually break a large block into smaller pieces, which degrades the coding efficiency. However, detailed description of a complex motion model requires sending more side information, which is also not efficient.

SUMMARY OF THE INVENTION

A method of estimating motion by estimating motion parameters of a complex motion model at the decoder side using reconstructed neighboring pixels of the current block and then applying the estimated motion parameters to the coordinates of the current block to determine motion compensated in a corresponding reference block.

In one aspect, a method of encoding a video programmed in a memory in a device comprises applying a set of motion models and a motion vector to a set of pixels neighboring a current block to generate new coordinates in a reference frame, selecting the new coordinates if a motion model of the set of motion models is a best motion model and computing estimated pixel values based on the new coordinates. The motion model comprises parameters for image effects. The image effects include rotation, zooming and panning. A sum of absolute differences is taken of the reference frame and the current block, and if the sum of absolute differences is a minimum, the new coordinates are used for motion estimation. The estimated pixel values in sub-pel positions are derived using interpolation. The set of motion models comprises limited candidates of motion models. The components of each of the motion models utilize assumptions. The assumptions include: a rotation component is assumed to be close to 0, a zooming component is assumed to be close to 1 and a panning component is assumed to be close to 0. The parameters are not transmitted to a decoder and are derived at the decoder; and the encoder only sends a 1-bit control-flag to indicate whether the derived parameters should be used. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-Ray® writer/player, a television and a home entertainment system.

In another aspect, a system for encoding a video programmed in a memory in a device comprises a motion model module for applying a set of motion models and a motion vector to a set of pixels neighboring a current block to generate new coordinates in a reference frame, a selection module for selecting the new coordinates if a motion model of the set of motion models is a best motion model and a computing module for computing estimated pixel values based on the new coordinates. The motion model comprises parameters for image effects. The image effects include rotation, zooming and panning. A sum of absolute differences is taken of the reference frame and the current block, and if the sum of absolute differences is a minimum, the new coordinates are used for motion estimation. The estimated pixel values in sub-pel positions are derived using interpolation. The set of motion models comprises limited candidates of motion models. The components of each of the motion models utilize assumptions. The assumptions include: a rotation component is assumed to be close to 0, a zooming component is assumed to be close to 1 and a panning component is assumed to be close to 0. The parameters are not transmitted to a decoder and are derived at the decoder; and the encoder only sends a 1-bit control-flag to indicate whether the derived parameters should be used. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-Ray® writer/player, a television and a home entertainment system.

In yet another aspect, a camera device comprises an image acquisition component for acquiring an image, a processing component for processing the image by applying a limited set of motion models, including image parameters, and a motion vector to a set of pixels neighboring a current block to generate new coordinates in a reference frame, selecting the new coordinates if a motion model of the set of motion models is a best motion model which is determined using a sum of absolute differences calculation and computing estimated pixel values based on the new coordinates and a memory for storing the processed image. The image effects include rotation, zooming and panning. A sum of absolute differences is taken of the reference frame and the current block, and if the sum of absolute differences is a minimum, the new coordinates are used for motion estimation. The estimated pixel values in sub-pel positions are derived using interpolation. The components of each of the motion models utilize assumptions. The assumptions include: a rotation component is assumed to be close to 0, a zooming component is assumed to be close to 1 and a panning component is assumed to be close to 0. The parameters are not transmitted to a decoder and are derived at the decoder; and the encoder only sends a 1-bit control-flag to indicate whether the derived parameters should be used.

In another aspect, an encoder comprises an intra coding module for encoding an image only using information from the image and an inter coding module for encoding the image including a motion compensated inter prediction component for applying a limited set of motion models utilizing assumptions, the motion models each including image parameters, and a motion vector to a set of pixels neighboring a current block to generate new coordinates in a reference frame, selecting the new coordinates if a motion model of the set of motion models is a best motion model which is determined using a sum of absolute differences calculation and computing estimated pixel values based on the new coordinates. The image effects include rotation, zooming and panning. A sum of absolute differences is taken of the reference frame and the current block, and if the sum of absolute differences is a minimum, the new coordinates are used for motion estimation. The estimated pixel values in sub-pel positions are derived using interpolation. The assumptions include: a rotation component is assumed to be close to 0, a zooming component is assumed to be close to 1 and a panning component is assumed to be close to 0. The parameters are not transmitted to a decoder and are derived at the decoder; and the encoder only sends a 1-bit control-flag to indicate whether the derived parameters should be used.

DETAILED DESCRIPTION OF THE PREFERRED EMBODIMENT

In computer graphics, the geometric transformation of a 2-dimensional image object is usually characterized using a homogeneous transformation matrix:

$$\begin{bmatrix} x' \\ y' \\ 1 \end{bmatrix} = \begin{bmatrix} a & b & t_x \\ c & d & t_y \\ 0 & 0 & 1 \end{bmatrix} \times \begin{bmatrix} x \\ y \\ 1 \end{bmatrix},$$

where (x, y) are the coordinates before transformation, and (x', y') are the coordinates after transformation. The translation distance is referred to as $(t_x, t_y)$. In video coding, the translation distances are signaled as motion vectors. The combination of rotation, zooming and other effects are referred to as parameters (a, b, c, d).

A way of describing an arbitrary motion model includes in addition to sending the motion vector $(t_x, t_y)$ for each block, the encoder also estimates the parameters (a, b, c, d) and signals the parameters (a, b, c, d) to the decoder. However, the gain in prediction performance might not be worth the cost of sending the overhead of parameters (a, b, c, d).

In video content, it is common for the geometric transformation to remain uniform over a large area. Therefore, the decoder is able to estimate the parameters of a complex motion model (e.g. a, b, c, d) from reconstructed neighboring pixels of the current block. The encoder sends one bit to the decoder in order to signal whether the estimated parameters should be applied to the current block.

Estimating Motion Parameters from Neighbors

Figure 1:
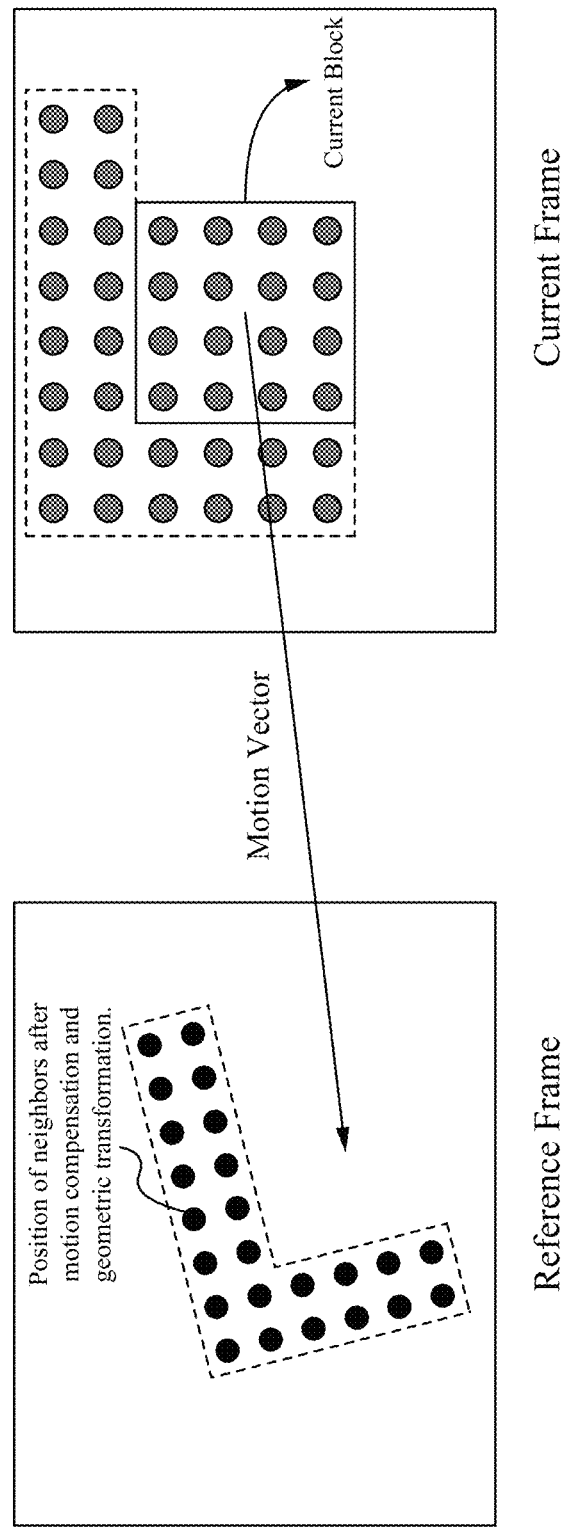
FIG. 1 illustrates a diagram of blocks to determine the parameters (a, b, c, d) according to some embodiments.

FIG. 1 illustrates a diagram of blocks to determine the parameters (a, b, c, d) according to some embodiments. A motion vector is known for the current block. In some embodiments, the motion vector $(t_x, t_y)$ is obtained from the bitstream. Additionally, the reconstructed neighborhood of the block is known. Different motion models which represent different sets of (a, b, c, d) are applied to the neighborhood with the motion vector $(t_x, t_y)$. The parameters (a, b, c, d) are from a priori assumptions as is described herein. The geometric transformation is applied, and new coordinates in the reference frame are found. A Sum of Absolute Differences (SAD) is taken of the new coordinates in the reference frame and the current block. If the SAD meets a desired result, then that set of parameters (a, b, c, d) is considered acceptable. For candidate tuples of (a, b, c, d), the candidate tuple that has the minimum Sum of Absolute Differences (SAD) between the neighbors and the motion compensated neighbors is found as the motion parameters. Based on the new coordinates, the pixel values of motion compensated reference of the neighbors are computed. For the new pixels, which are in sub-pel positions, interpolation is performed to derive the pixel values.

Figure 2:
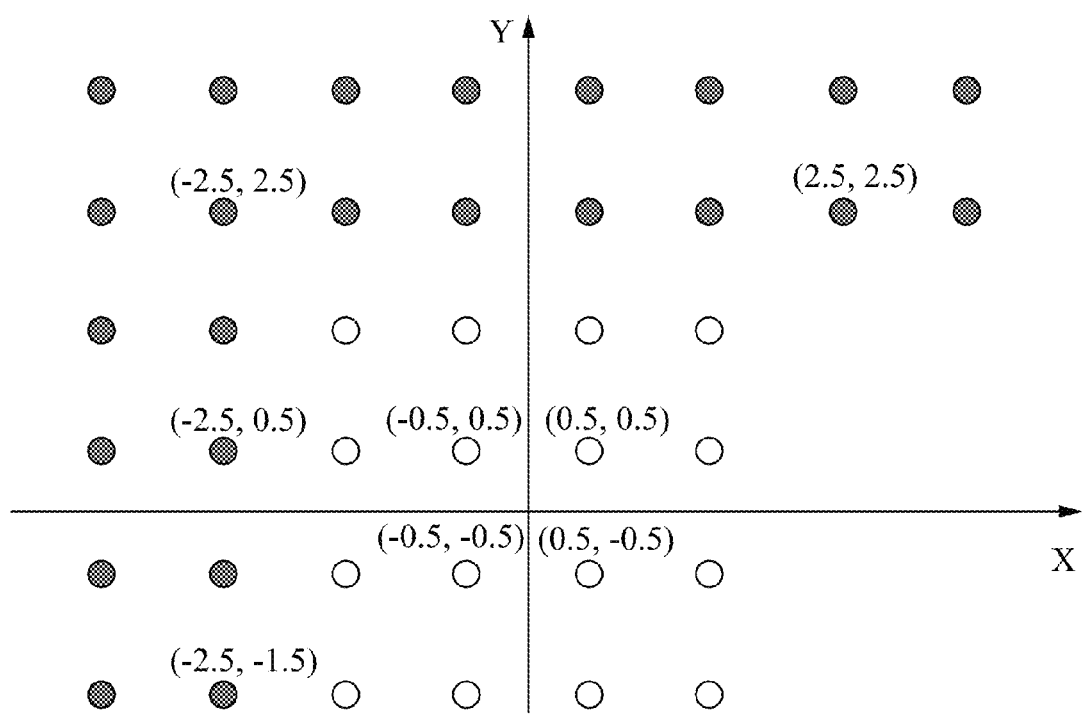
FIG. 2 illustrates a diagram for calculating coordinates according to some embodiments.

FIG. 2 illustrates a diagram for calculating coordinates according to some embodiments. The motion vector of the current block is located at the center of the block (0, 0). The distance between neighboring pixels is 1 in either the x or the y direction. The calculated parameters (a, b, c, d) and motion vector $(t_x, t_y)$ are able to be applied to the neighboring block pixels to obtain the new coordinates of the reference frame. In some embodiments, the decoder computes the pixel locations in the reference frame using the transmitted motion vector and the a priori geometric model (a, b, c, d).

A Priori Motion Models

As discussed, in addition to the translational motion vector $(t_x, t_y)$, the decoder also estimates other parameters (a, b, c, d). An exhaustive search of all combinations of (a, b, c, d) is prohibitively complex. Therefore, a search of a limited candidate space of a priori motion models, where the geometric transformation is a combination of simple transformations, such as rotation, zooming and panning is implemented. In this case, the tuple (a, b, c, d) is able to be computed as:

$$\begin{bmatrix} a & b \\ c & d \end{bmatrix} = \begin{bmatrix} \cos\theta & -\sin\theta \\ \sin\theta & \cos\theta \end{bmatrix} \times \begin{bmatrix} s_x & 0 \\ 0 & s_y \end{bmatrix} \times \begin{bmatrix} 1 & 0 \\ k & 1 \end{bmatrix}$$

It is further assumed that the transformations are relatively small (e.g. $\theta$ and k are close to 0 and $s_x$, $s_y$ are close to 1). Thus, a search of a small space over $(\theta, k, s_x, s_y)$ reduces computations. The search occurs over the small space and eventually determines the best match to estimate the parameters (a, b, c, d).

Since a neighboring block may not be related to the current block (e.g. if at a boundary), the decoder should be informed of whether the neighboring block is useful. If the encoder signals a "1" to the decoder, the estimated motion parameters will be used for the current block. Otherwise, the motion model is still the simple translational model, signaled by $(t_x, t_y)$. The decoder applies the homogeneous matrix:

$$\begin{bmatrix} a & b & t_x \\ c & d & t_y \\ 0 & 0 & 1 \end{bmatrix}$$

to the coordinates of the current block and find its motion compensated correspondence in the reference block. Using the computed pixel coordinates to predict the current block, if any pixels are in sub-pel positions, the pixel value is derived through interpolation.

In some embodiments, instead of the encoder transmitting the parameters (a, b, c, d) to the decoder, the difference (e.g. a delta) between the values determined by the encoder and the estimated parameters determined by the decoder are transmitted. In some embodiments, parameters are not transmitted to a decoder and are derived at the decoder; and the encoder only sends a 1-bit control-flag to indicate whether the derived parameters should be used.

Figure 3:
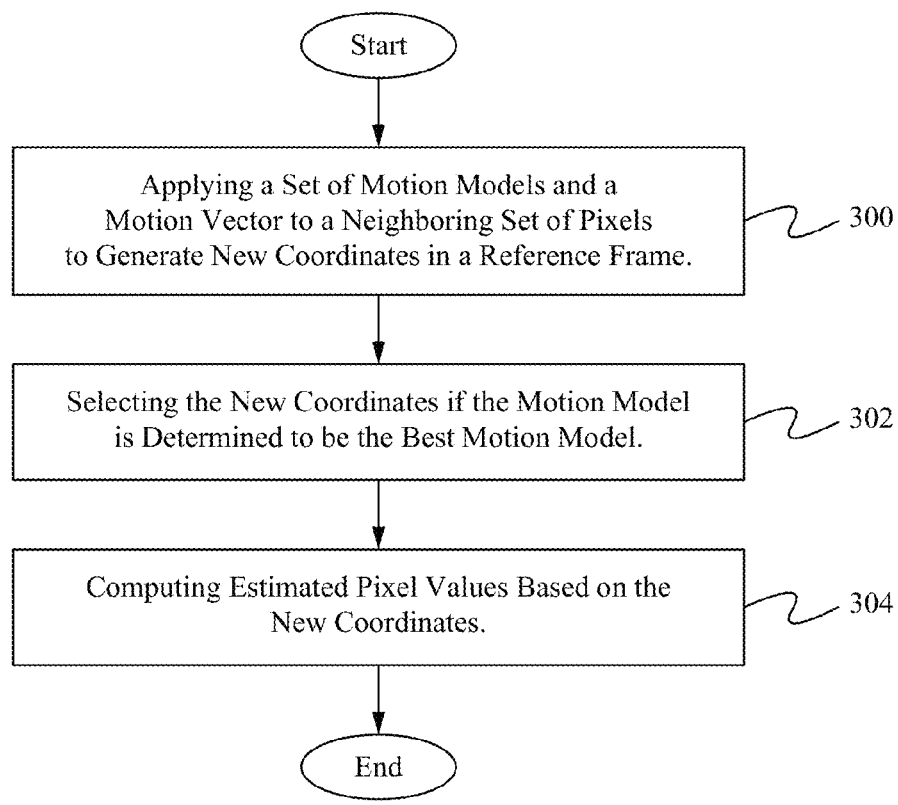
FIG. 3 illustrates a flowchart of a method of estimating motion according to some embodiments.

FIG. 3 illustrates a flowchart of a method of estimating motion according to some embodiments. In the step 300, a set of motion models and a motion vector are applied to a set of pixels neighboring a current block to generate new coordinates in a reference frame. In the step 302, the new coordinates are selected if a motion model of the set of motion models is a best motion model. In some embodiments, the best motion model is determined by taking an SAD of the new coordinates and the original neighbors. In the step 304, estimated pixel values are computed based on the new coordinates. In some embodiments, fewer or more steps are included.

Figure 4:
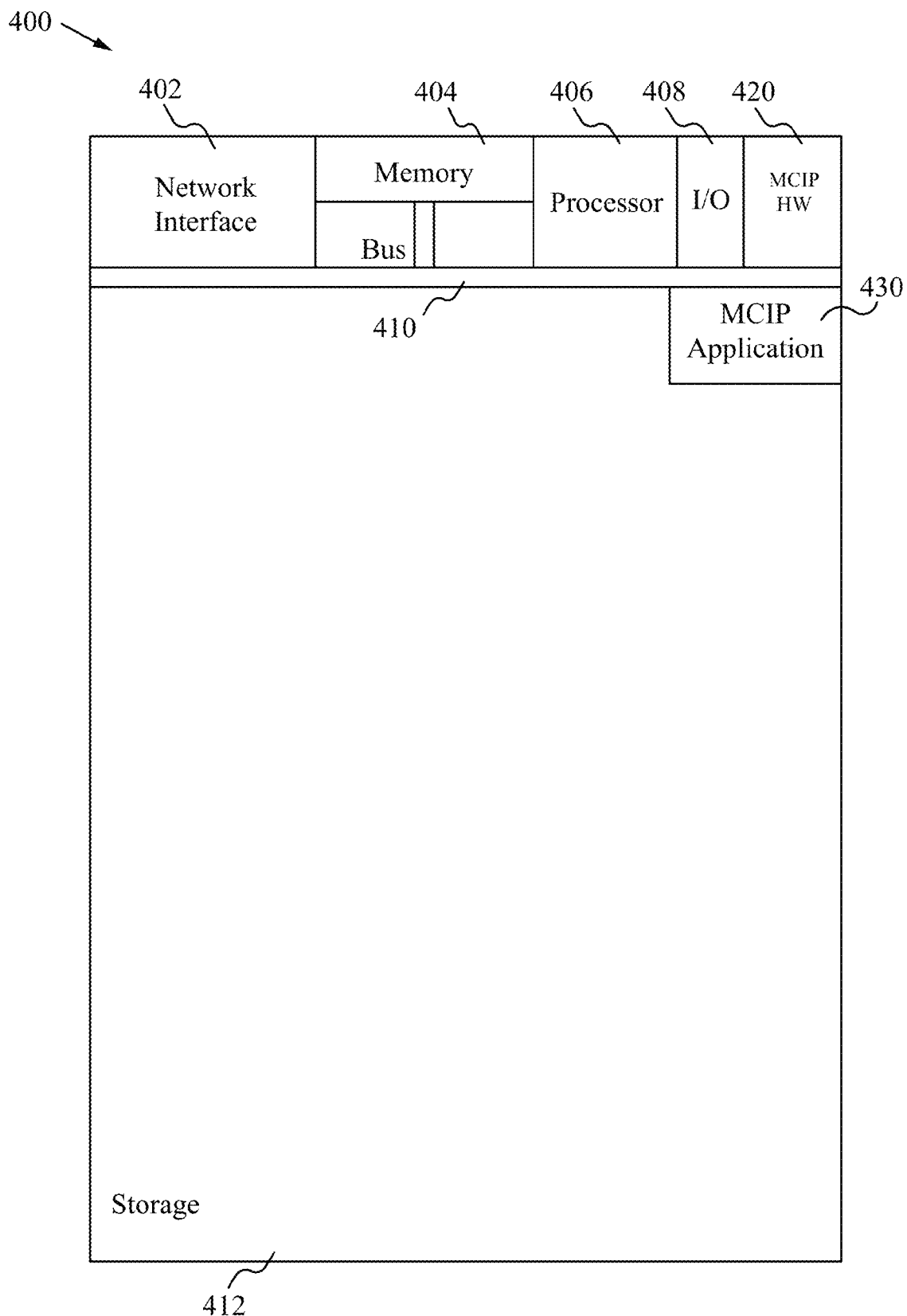
FIG. 4 illustrates a block diagram of an exemplary computing device configured to implement motion compensated inter prediction according to some embodiments.

FIG. 4 illustrates a block diagram of an exemplary computing device 400 configured to implement motion compensated inter prediction according to some embodiments. The computing device 400 is able to be used to process information such as images and videos. For example, a computing device 400 is able to encode video using motion compensated inter prediction. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, Blu-ray Disc™, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, display, printer, modem, touchscreen, button interface and other devices. Motion compensated inter prediction application(s) 430 used to perform the motion compensated inter prediction are likely to be stored in the storage device 412 and memory 404 and processed as applications are typically processed. More or less components than shown in FIG. 4 are able to be included in the computing device 400. In some embodiments, motion compensated inter prediction hardware 420 is included. Although the computing device 400 in FIG. 4 includes applications 430 and hardware 420 for implementing motion compensated inter prediction, the motion compensated inter prediction is able to be implemented on a computing device in hardware, firmware, software or any combination thereof.

In some embodiments, the motion compensated inter prediction application(s) 430 include several applications and/or modules. In some embodiments, the motion compensated inter prediction application(s) 430 include modules such as a motion model module for applying different motion models and a motion vector to a neighborhood to generate new coordinates in a reference frame, a selection module for selecting the new coordinates determined by the best motion model and an estimation model for computing estimated pixel values based on the new coordinates. In some embodiments, fewer or additional modules and/or sub-modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-Ray® writer/player, a television, a home entertainment system or any other suitable computing device.

Figure 5:
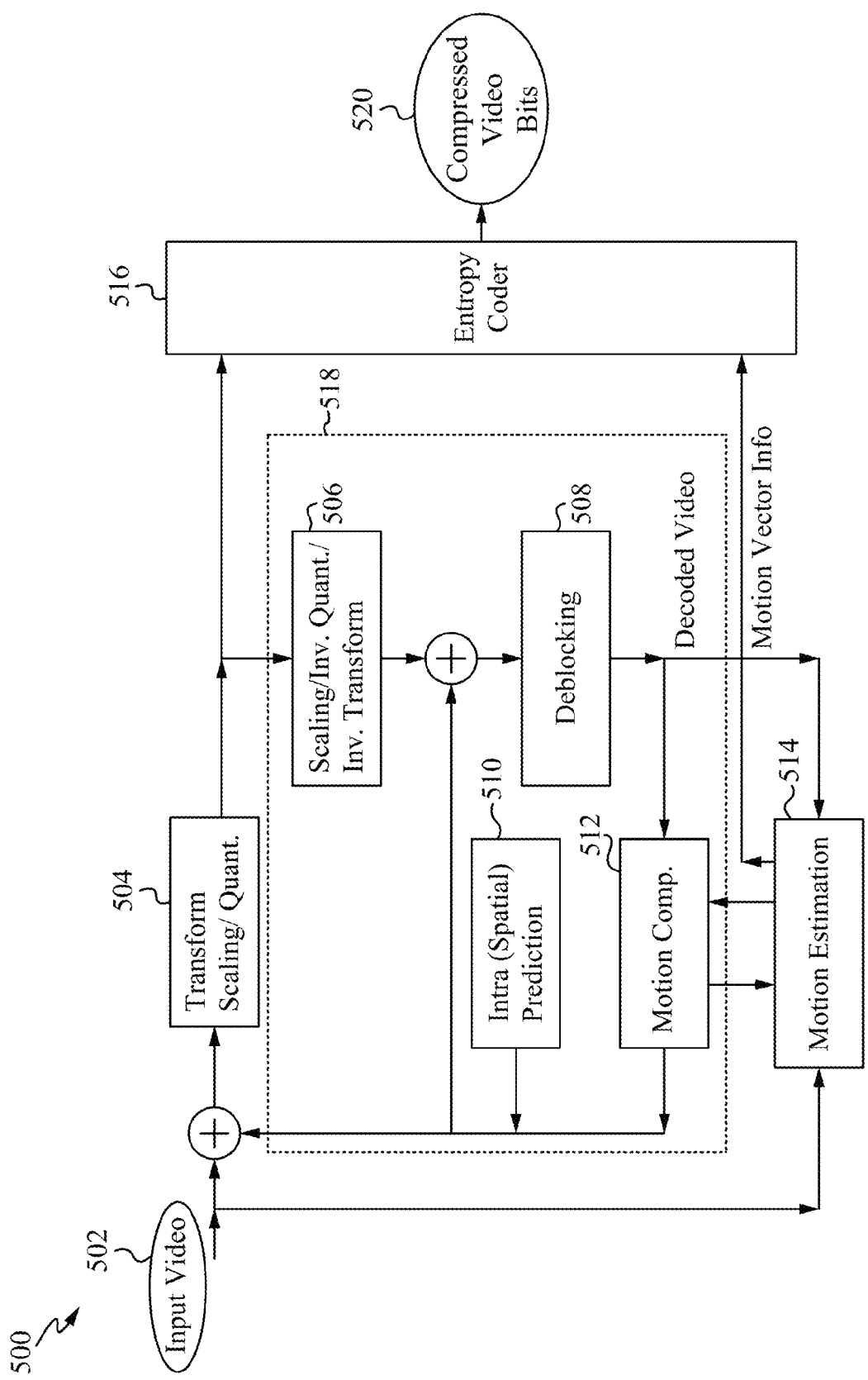
FIG. 5 illustrates a block diagram of a video coding layer of a macroblock.

FIG. 5 illustrates a block diagram of a video coding layer 500 of a macroblock. The video coding layer 500 (e.g. the encoder) includes a combination of temporal and spatial predictions along with transform coding. An input video 502 is received and split into a plurality of blocks. The first picture of a sequence is usually "intra" coded using only information contained within itself. Each part of a block in an intra frame is then predicted at the intra prediction module 510 using spatially neighboring samples of previously coded blocks. The encoding process chooses which neighboring samples are utilized for intra prediction and how they are used. This process is conducted at the local decoder 518 as well as at the encoder 500. For the rest of the pictures of a sequence, usually "inter" coding is used. Inter coding implements motion compensation 512 from other previously decoded pictures. In some embodiments, "inter" coding includes one or more embodiments of the motion compensated inter prediction methods described herein. The encoding process for inter prediction/motion estimation at the motion estimation module 514 includes choosing motion data, determining the reference picture and a spatial displacement that is applied to all samples of the block. The motion data is transmitted as side information which is used by the encoder 500 and the local decoder 518.

The difference between the original and the predicted block is referred to as the residual of the prediction. The residual is transformed, and the transform coefficients are scaled and quantized at the transform and scaling quantization module 504. Each block is transformed using an integer transform, and the transform coefficients are quantized and transmitted using entropy-coding methods. An entropy encoder 516 uses a codeword set for all elements except the quantized transform coefficients. For the quantized transform coefficients, Context Adaptive Variable Length Coding (CAVLC) or Context Adaptive Binary Arithmetic Coding (CABAC) is utilized. The deblocking filter 508 is implemented to control the strength of the filtering to reduce the blockiness of the image.

The encoder 500 also contains the local decoder 518 to generate prediction reference for the next blocks. The quantized transform coefficients are inverse scaled and inverse transformed 506 in the same way as the encoder side which gives a decoded prediction residual. The decoded prediction residual is added to the prediction, and the combination is directed to the deblocking filter 508 which provides decoded video as output. Ultimately, the entropy coder 516 produces compressed video bits 520 of the originally input video 502.

To utilize motion compensated inter prediction, a device such as a digital camera or camcorder is used to acquire an image or video of the scene. The motion compensated inter prediction is automatically performed. The motion compensated inter prediction is also able to be implemented after the image is acquired to perform post-acquisition processing.

In operation, motion compensated inter prediction is for block-based transforms. The compression method involves estimating motion parameters of a complex motion model using reconstructed neighboring pixels of the current block and applying the estimated motion parameters to the coordinates of the current block to determine motion compensated in a corresponding reference block. By implementing motion compensated inter prediction, compression efficiency is improved.

Some Embodiments of Decoder-Derived Geometric Transformations for Motion Compensated Inter Prediction 1. A method of encoding a video programmed in a memory in a device comprising:
   a. applying a set of motion models and a motion vector to a set of pixels neighboring a current block to generate new coordinates in a reference frame;
   b. selecting the new coordinates if a motion model of the set of motion models is a best motion model; and
   c. computing estimated pixel values based on the new coordinates.
2. The method of clause 1 wherein the motion model comprises parameters for image effects.
3. The method of clause 2 wherein the image effects include rotation, zooming and panning.
4. The method of clause 1 wherein a sum of absolute differences is taken of the reference frame and the current block, and if the sum of absolute differences is a minimum, the new coordinates are used for motion estimation.
5. The method of clause 1 wherein the estimated pixel values in sub-pel positions are derived using interpolation.
6. The method of clause 1 wherein the set of motion models comprises limited candidates of motion models.
7. The method of clause 1 wherein the components of each of the motion models utilize assumptions.
8. The method of clause 7 wherein the assumptions include: a rotation component is assumed to be close to 0, a zooming component is assumed to be close to 1 and a panning component is assumed to be close to 0.
9. The method of clause 2 wherein the parameters are not transmitted to a decoder and are derived at the decoder; and wherein an encoder only sends a 1-bit control-flag to indicate whether the derived parameters should be used.
10. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-Ray® writer/player, a television and a home entertainment system.
11. A system for encoding a video programmed in a memory in a device comprising:
    a. a motion model module for applying a set of motion models and a motion vector to a set of pixels neighboring a current block to generate new coordinates in a reference frame;
    b. a selection module for selecting the new coordinates if a motion model of the set of motion models is a best motion model; and
    c. a computing module for computing estimated pixel values based on the new coordinates.
12. The system of clause 11 wherein the motion model comprises parameters for image effects.
13. The system of clause 11 wherein the image effects include rotation, zooming and panning.
14. The system of clause 11 wherein a sum of absolute differences is taken of the reference frame and the current block, and if the sum of absolute differences is a minimum, the new coordinates are used for motion estimation.
15. The system of clause 11 wherein the estimated pixel values in sub-pel positions are derived using interpolation.
16. The system of clause 11 wherein the set of motion models comprises limited candidates of motion models.
17. The system of clause 11 wherein the components of each of the motion models utilize assumptions.
18. The system of clause 17 wherein the assumptions include: a rotation component is assumed to be close to 0, a zooming component is assumed to be close to 1 and a panning component is assumed to be close to 0.
19. The system of clause 12 wherein the parameters are not transmitted to a decoder and are derived at the decoder; and wherein an encoder only sends a 1-bit control-flag to indicate whether the derived parameters should be used.
20. The system of clause 11 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-Ray® writer/player, a television and a home entertainment system.
21. A camera device comprising:
    a. an image acquisition component for acquiring an image;
    b. a processing component for processing the image by:
       i. applying a limited set of motion models, including image parameters, and a motion vector to a set of pixels neighboring a current block to generate new coordinates in a reference frame;
       ii. selecting the new coordinates if a motion model of the set of motion models is a best motion model which is determined using a sum of absolute differences calculation; and
       iii. computing estimated pixel values based on the new coordinates; and
    c. a memory for storing the processed image.
22. The camera device of clause 21 wherein the image effects include rotation, zooming and panning.
23. The camera device of clause 21 wherein a sum of absolute differences is taken of the reference frame and the current block, and if the sum of absolute differences is a minimum, the new coordinates are used for motion estimation.
24. The camera device of clause 21 wherein the estimated pixel values in sub-pel positions are derived using interpolation.
25. The camera device of clause 21 wherein the components of each of the motion models utilize assumptions.
26. The camera device of clause 25 wherein the assumptions include: a rotation component is assumed to be close to 0, a zooming component is assumed to be close to 1 and a panning component is assumed to be close to 0.
27. The camera device of clause 21 wherein the parameters are not transmitted to a decoder and are derived at the decoder; and wherein an encoder only sends a 1-bit control-flag to indicate whether the derived parameters should be used.
28. An encoder comprising:
    a. an intra coding module for encoding an image only using information from the image; and
    b. an inter coding module for encoding the image including a motion compensated inter prediction component for:
       i. applying a limited set of motion models utilizing assumptions, the motion models each including image parameters, and a motion vector to a set of pixels neighboring a current block to generate new coordinates in a reference frame;
       ii. selecting the new coordinates if a motion model of the set of motion models is a best motion model which is determined using a sum of absolute differences calculation; and
       iii. computing estimated pixel values based on the new coordinates.

29. The encoder of clause 28 wherein the image effects include rotation, zooming and panning.
30. The encoder of clause 28 wherein a sum of absolute differences is taken of the reference frame and the current block, and if the sum of absolute differences is a minimum, the new coordinates are used for motion estimation.
31. The encoder of clause 28 wherein the estimated pixel values in sub-pel positions are derived using interpolation.
32. The encoder of clause 28 wherein the assumptions include: a rotation component is assumed to be close to 0, a zooming component is assumed to be close to 1 and a panning component is assumed to be close to 0.
33. The encoder of clause 28 wherein the parameters are not transmitted to a decoder and are derived at the decoder; and wherein the encoder only sends a 1-bit control-flag to indicate whether the derived parameters should be used.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of encoding a video programmed in a memory in a device comprising:
   a. applying a set of motion models and a motion vector to a set of pixels neighboring a current block to generate new coordinates in a reference frame;
   b. selecting the new coordinates if a motion model of the set of motion models is a best motion model; and
   c. computing estimated pixel values based on the new coordinates, wherein the motion model comprises parameters for image effects, wherein the parameters are not transmitted to a decoder and are derived at the decoder, and wherein an encoder only sends a 1-bit control-flag to indicate whether the derived parameters should be used.
2. The method of claim 1 wherein the image effects include rotation, zooming and panning.
3. The method of claim 1 wherein a sum of absolute differences is taken of the reference frame and the current block, and if the sum of absolute differences is a minimum, the new coordinates are used for motion estimation.
4. The method of claim 1 wherein the estimated pixel values in sub-pel positions are derived using interpolation.
5. The method of claim 1 wherein the set of motion models comprises limited candidates of motion models.
6. The method of claim 1 wherein the components of each of the motion models utilize assumptions.
7. The method of claim 6 wherein the assumptions include: a rotation component is assumed to be close to 0, a zooming component is assumed to be close to 1 and a panning component is assumed to be close to 0.
8. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
9. A system for encoding a video programmed in a memory in a device comprising:
   a. a motion model module for applying a set of motion models and a motion vector to a set of pixels neighboring a current block to generate new coordinates in a reference frame;
   b. a selection module for selecting the new coordinates if a motion model of the set of motion models is a best motion model; and
   c. a computing module for computing estimated pixel values based on the new coordinates, wherein the motion model comprises parameters for image effects, wherein the parameters are not transmitted to a decoder and are derived at the decoder, and wherein an encoder only sends a 1-bit control-flag to indicate whether the derived parameters should be used.
10. The system of claim 9 wherein the image effects include rotation, zooming and panning.
11. The system of claim 9 wherein a sum of absolute differences is taken of the reference frame and the current block, and if the sum of absolute differences is a minimum, the new coordinates are used for motion estimation.
12. The system of claim 9 wherein the estimated pixel values in sub-pel positions are derived using interpolation.
13. The system of claim 9 wherein the set of motion models comprises limited candidates of motion models.
14. The system of claim 9 wherein the components of each of the motion models utilize assumptions.
15. The system of claim 14 wherein the assumptions include: a rotation component is assumed to be close to 0, a zooming component is assumed to be close to 1 and a panning component is assumed to be close to 0.
16. The system of claim 9 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
17. A camera device comprising:
   a. an image acquisition component for acquiring an image;
   b. a processing component for processing the image by:
      i. applying a limited set of motion models, including image parameters, and a motion vector to a set of pixels neighboring a current block to generate new coordinates in a reference frame;
      ii. selecting the new coordinates if a motion model of the set of motion models is a best motion model which is determined using a sum of absolute differences calculation; and
      iii. computing estimated pixel values based on the new coordinates, wherein the parameters are not transmitted to a decoder and are derived at the decoder, and wherein an encoder only sends a 1-bit control-flag to indicate whether the derived parameters should be used; and
   c. a memory for storing the processed image.
18. The camera device of claim 17 wherein the image effects include rotation, zooming and panning.
19. The camera device of claim 17 wherein a sum of absolute differences is taken of the reference frame and the current block, and if the sum of absolute differences is a minimum, the new coordinates are used for motion estimation.

20. The camera device of claim 17 wherein the estimated pixel values in sub-pel positions are derived using interpolation.

21. The camera device of claim 17 wherein the components of each of the motion models utilize assumptions.

22. The camera device of claim 21 wherein the assumptions include: a rotation component is assumed to be close to 0, a zooming component is assumed to be close to 1 and a panning component is assumed to be close to 0.

23. An encoder device comprising:
  a. an intra coding module for encoding an image only using information from the image; and
  b. an inter coding module for encoding the image including a motion compensated inter prediction component for:
    i. applying a limited set of motion models utilizing assumptions, the motion models each including image parameters, and a motion vector to a set of pixels neighboring a current block to generate new coordinates in a reference frame;
    ii. selecting the new coordinates if a motion model of the set of motion models is a best motion model which is determined using a sum of absolute differences calculation; and
    iii. computing estimated pixel values based on the new coordinates, wherein a delta of the image parameters is transmitted, wherein the delta is a difference between values determined by the encoder device and estimated parameters determined by a decoder.

24. The encoder device of claim 23 wherein the image effects include rotation, zooming and panning.

25. The encoder device of claim 23 wherein a sum of absolute differences is taken of the reference frame and the current block, and if the sum of absolute differences is a minimum, the new coordinates are used for motion estimation.

26. The encoder device of claim 23 wherein the estimated pixel values in sub-pel positions are derived using interpolation.

27. The encoder device of claim 23 wherein the assumptions include: a rotation component is assumed to be close to 0, a zooming component is assumed to be close to 1 and a panning component is assumed to be close to 0.

28. The encoder device of claim 23 wherein the parameters are not transmitted to a decoder and are derived at the decoder; and wherein the encoder only sends a 1-bit control-flag to indicate whether the derived parameters should be used.

* * * * *